United States Patent
Brace et al.

(10) Patent No.: US 6,639,751 B2
(45) Date of Patent: Oct. 28, 2003

(54) DATA CARTRIDGE LIBRARY

(75) Inventors: Clark D. Brace, Westminster, CO (US); Ron M. Permut, Louisville, CO (US); David W. Roecker, Denver, CO (US); Lee A. Sutherland, Wellington, CO (US); Jennifer L. Woodruff, Longmont, CO (US)

(73) Assignee: Spectra Logic Corporation, Boulder, CO (US)

( * ) Notice: Subject to any disclaimer, the term of this patent is extended or adjusted under 35 U.S.C. 154(b) by 0 days.

(21) Appl. No.: 09/682,800

(22) Filed: Oct. 19, 2001

(65) Prior Publication Data

US 2003/0076618 A1 Apr. 24, 2003

(51) Int. Cl.⁷ ............................................. G11B 15/68
(52) U.S. Cl. ...................................................... 360/92
(58) Field of Search ............................. 360/92; 369/37

(56) References Cited

U.S. PATENT DOCUMENTS

| | | | |
|---|---|---|---|
| 4,386,382 A | * 5/1983 | Cutler et al. | 360/92 |
| 5,157,564 A | 10/1992 | Theobald et al. | 360/92 |
| 5,235,474 A | 8/1993 | Searle | 360/71 |
| 5,684,654 A | 11/1997 | Searle et al. | 360/92 |
| 5,768,047 A | * 6/1998 | Ulrich et al. | 360/92 |
| 5,818,723 A | 10/1998 | Dimitri | 364/478.02 |
| 5,867,344 A | * 2/1999 | Ellis et al. | 360/92 |
| 5,995,320 A | * 11/1999 | Ostwald | 360/92 |
| 6,034,928 A | * 3/2000 | Inoue | 360/92 |
| 6,215,611 B1 | * 4/2001 | Gibbons | 360/92 |
| 6,411,462 B1 | * 6/2002 | Ostwald et al. | 360/92 |

* cited by examiner

Primary Examiner—Allen Cao
(74) Attorney, Agent, or Firm—Holland & Hart LLP; Christopher J. Kulish, Esq.

(57) ABSTRACT

The present invention provides an architecture for a data cartridge library that has a high data density footprint, i.e., is capable of storing data cartridges such that the density of data stored per area of floor space is high. In one embodiment, the architecture includes a plurality of shelves with each shelf capable of holding at least one data cartridge drawer that holds cartridges such that the face of the cartridges stored therein are substantially parallel to a side of the library.

26 Claims, 7 Drawing Sheets

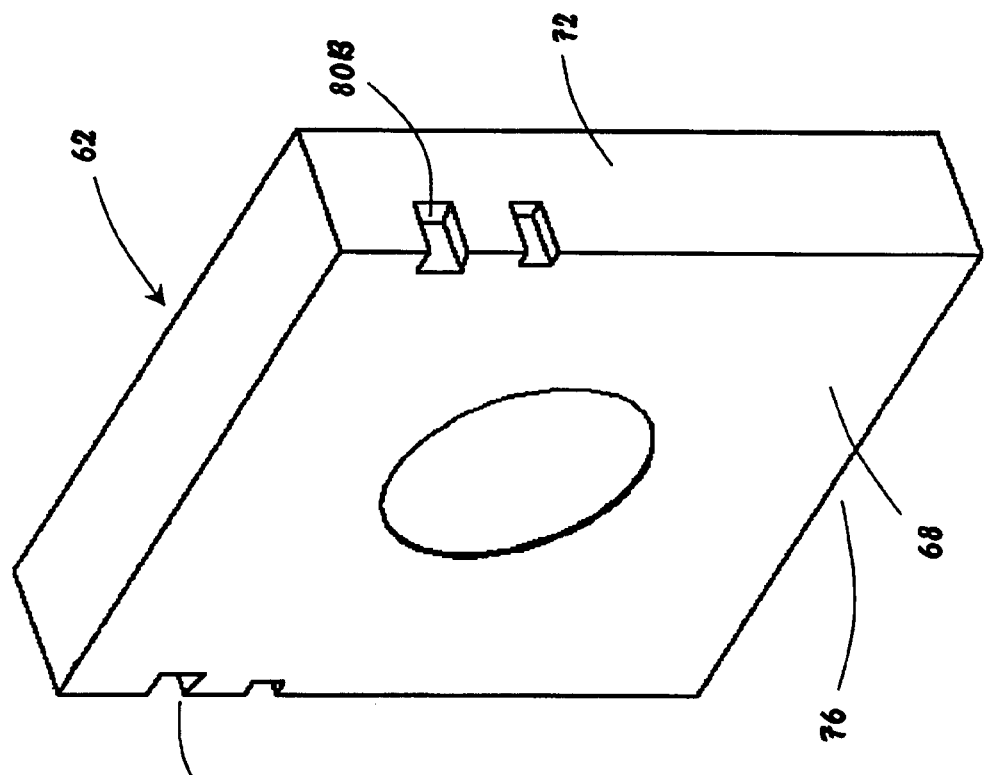
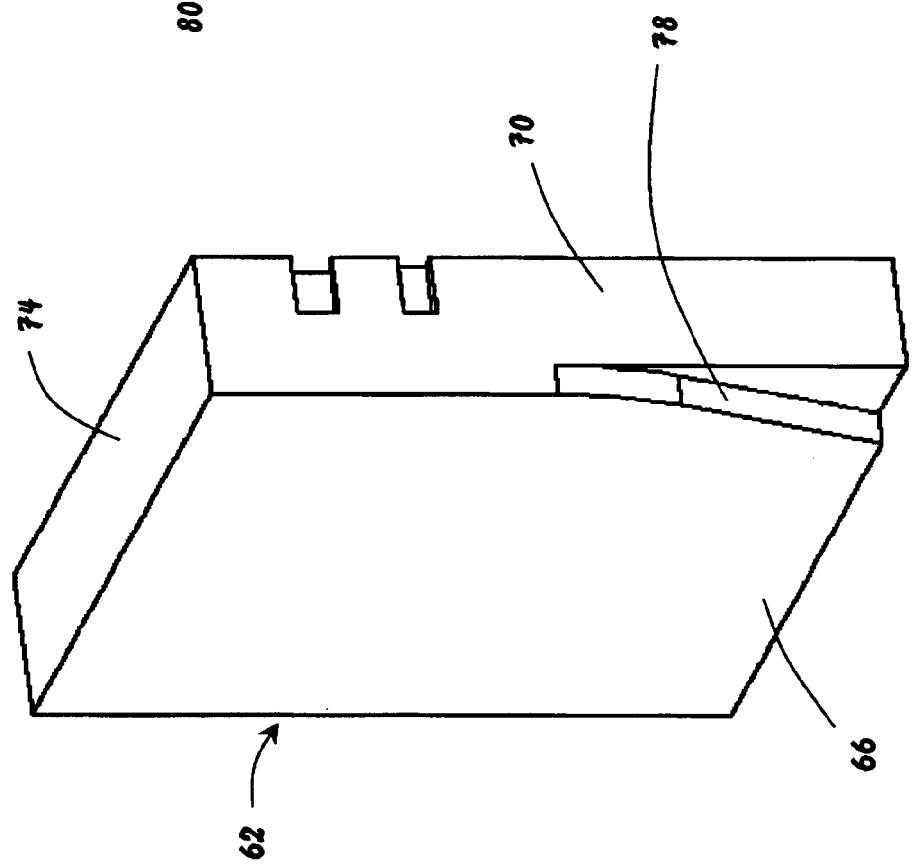
Fig. 4A
Fig. 4B

DATA CARTRIDGE LIBRARY

FIELD OF THE INVENTION

The present invention is directed to a data cartridge library and, in particular, to an architecture for a data cartridge library that yields a high data density footprint.

BACKGROUND OF THE INVENTION

Data cartridge library systems are primarily used to archive data, i.e., store data that is or may be important to the user of a computer system or network but not immediately needed by the user. To elaborate, the typical library system receives data from a host computer and stores the data in one or more data cartridges. When the host computer requires some of the data that was previously stored in a data cartridge, a request for the data is sent from the host computer to the library system. In response, the library system locates the data cartridge in which the desired data is located, retrieves the data from the recording medium within the cartridge using a drive, and transmits the data to the host computer system.

The typical data cartridge library system is comprised of: (a) a plurality of storage slots, with each slot capable of holding a data cartridge; (b) one or more drives, with each drive at least capable of reading data that has been stored in a data cartridge and, more typically, capable of reading data stored in a data cartridge and writing data on the recording medium located within a data cartridge; (c) a transport device that is capable of moving data cartridges between the slots and the drive(s); and (d) an interface for transferring data between the library system and a host computer, where the transfer typically takes place over a computer network that includes two or more host computer systems. The operation of reading data previously stored in a data cartridge located in the library begins with the transport device locating the slot that holds the cartridge with the desired data, removing the cartridge from the slot, transporting the cartridge to the drive, and facilitating the insertion of the cartridge into the drive. The drive then reads the desired data from the recording medium located in the cartridge and provides the data to the interface for transport to the host computer that requested the data. After the desired data has been read, the transport mechanism facilitates the removal of the cartridge from the drive, transports the cartridge to a slot (typically, the slot from which the cartridge was originally retrieved), and inserts the cartridge into the slot. The operation of writing data on the recording medium located in a cartridge involves the use of the transport mechanism to move a cartridge from a slot to a drive. After the cartridge is installed in the drive, data from a host computer that has been received at the interface is written or established on the recording medium within the cartridge by the drive. After the data has been written on the recording medium, the transport mechanism retrieves the cartridge from the drive and transports the cartridge to a slot for storage.

SUMMARY OF THE INVENTION

The present invention is directed to a data cartridge library architecture that provides a high data density footprint, i.e., the amount of data that the library architecture is capable of storing when the maximum number of data cartridges are housed within the library divided by the floor space occupied by the library is relatively high. A high data density footprint is important in applications where the floor space that can be dedicated to data storage is limited and the amount of data that needs to be stored is relatively large. One notable example of such an application is data centers that provide off-site "backup" or "mirroring" of the data stored on their clients computer systems. Such data centers want to maximize the amount of data that can be stored in a given floor space.

In one embodiment, a data cartridge library system is provided that comprises a cabinet with side walls that define a rectangular, box-like structure which defines an interior space. Located within the interior space are one or more drives, with each drive capable of at least reading data that has been previously established on the recording medium within a data cartridge. Also situated within the interior space is a shelf system that is capable of supporting at least two data cartridge drawers. The shelf system includes at least one shelf that extends outwards from one of two, opposite walls of the cabinet but terminates before reaching the other of the two, opposite walls, i.e., terminates within the interior space. A transport mechanism is substantially free to move within a space that extends between the end of a drawer located on the shelf and the other of the two, opposite walls of the cabinet. Stated differently, the space between the two opposite walls includes: (1) a first space between one of the two, opposite walls and the end of a drawer located on the shelf that is dedicated to supporting the drawer, and (2) a second space between the end of the drawer that faces the interior space when the drawer is on the shelf and the opposite wall that is dedicated to a transport mechanism, i.e., the transport mechanism is free to move in this space. The drawers each include a plurality of slots, with each slot capable of holding a data cartridge in an orientation such that the face of the cartridge with the greatest surface area is substantially parallel to the two, opposite sides of the cabinet between which the shelf extends or substantially parallel to the other two, opposite sides of the cabinet. Additionally, the shelf is situated such that when a drawer is on the shelf, at least one of the slots cannot be accessed for either removal/insertion of cartridges. As a consequence, the drawer must be withdrawn from the shelf and into the space dedicated to the transport mechanism so that the slot or slots not otherwise accessible for removal/insertion of data cartridges are accessible.

In one embodiment, the shelf system includes two shelves, the first shelf extending from the first side of the cabinet and the second shelf extending from the opposite side of the cabinet. The two shelves are substantially at the same height or elevation in the cabinet. With the two shelves oriented in this fashion, it is possible to move a drawer from the first shelf to the second shelf with a transport mechanism and without repositioning the transport mechanism. In this embodiment, it should be appreciated that the space within which the transport mechanism is able to freely move is located between the two shelves.

In another embodiment, a shelf within the shelf system includes a first orientation structure for cooperating with a second orientation structure on a drawer to insure that when a drawer is situated on the shelf, the drawer is oriented such that one end of the drawer is located adjacent to the side of the cabinet. The ability to orient the drawer in this manner facilitates the orientation of any data cartridges located in the drawer for grasping by a transport mechanism. To elaborate, the drawer employs additional orientation structures, one associated with each slot, to insure that any data cartridges in the drawer each have the same an orientation within the drawer. The first and second orientation structures and the orientation structures within the drawer insure that any data cartridges located within the drawer present the same orientation to the transport mechanism. This, in turn, facilitates the grasping of the data cartridges by the transport mechanism.

In yet another embodiment, when the shelf system includes shelves extending from opposite sides of the cabinet, the orientation structure associated with the first shelf that extends from the first side is the mirror image of the orientation structure associated with the second shelf that extends from the opposite side. Consequently, these orientation structures avoid any need, in transferring of a drawer from the first shelf to the second shelf, to rotate the drawer about a vertical axis.

In another embodiment, the shelf includes a first retaining structure that cooperates with a second retaining structure on a drawer to hold the drawer on the shelf. In one embodiment, the first retaining structure and second retaining structure form a passive latch that is actuated as a result of the transport mechanism withdrawing the drawer from the shelf or pushing the drawer onto the shelf. In other embodiments, an active latch is employed that is again comprised of a first retaining structure associated with the shelf and a second retaining structure associated with the drawer. However, in the case of an active latch, the transport mechanism is required to actuate the latch so that a drawer can be withdrawn from the shelf.

Other embodiments employ a shelf system with multiple shelves in various configurations. Possible multiple shelf configurations include: (1) at least two shelves, each extending from the first side of the cabinet and with one shelf located at a higher elevation than the other shelf; (2) at least three shelves, with two shelves extending from the first side with one shelf at a higher elevation than the other shelf and the third shelf extending from the opposite side of the cabinet; and (3) at least four shelves, with two shelves extending from the first side with one shelf at a higher elevation than the other shelf and with the other two shelves extending from the opposite side with one shelf at a higher elevation than the other shelf.

Yet a further embodiment employs a drive oriented such that the face of the drive that has the opening for receiving a data cartridge is substantially parallel to the side of the cabinet from which a shelf extends. Another embodiment utilizes a drive that is oriented such that the face of the drive that has the opening for receiving a data cartridge is substantially parallel to a side of the cabinet from which a shelf does not extend. Stated differently, the drive is located between the two opposite sides between which one or more shelves extend.

BRIEF DESCRIPTION OF THE DRAWINGS

FIGS. 4A and 4B are perspective views of an LTO tape cartridge;

DETAILED DESCRIPTION

Figure 1:
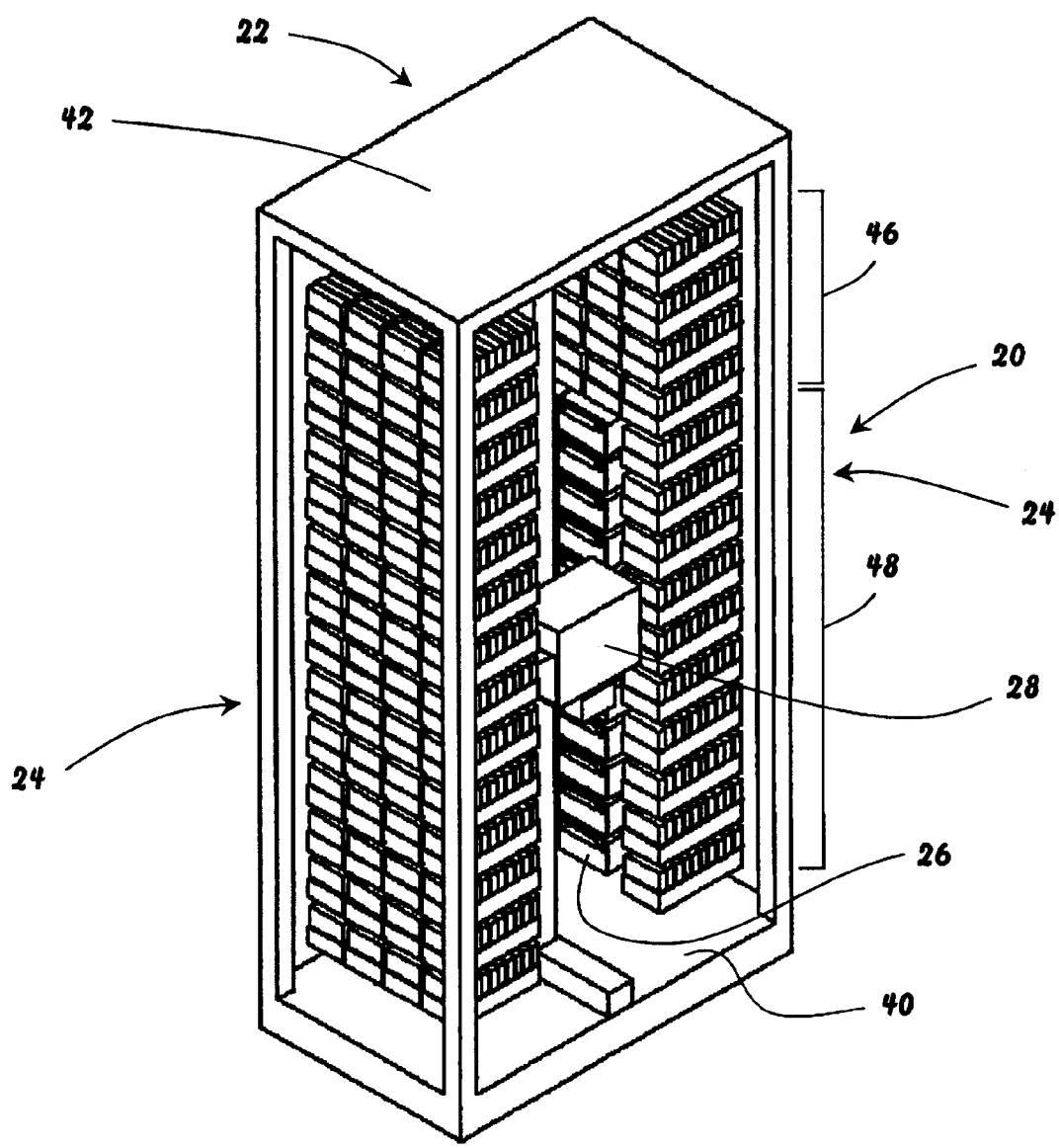
FIG. 1 is a perspective view of one embodiment of a data cartridge library system that has a high data density footprint.
Figure 2:
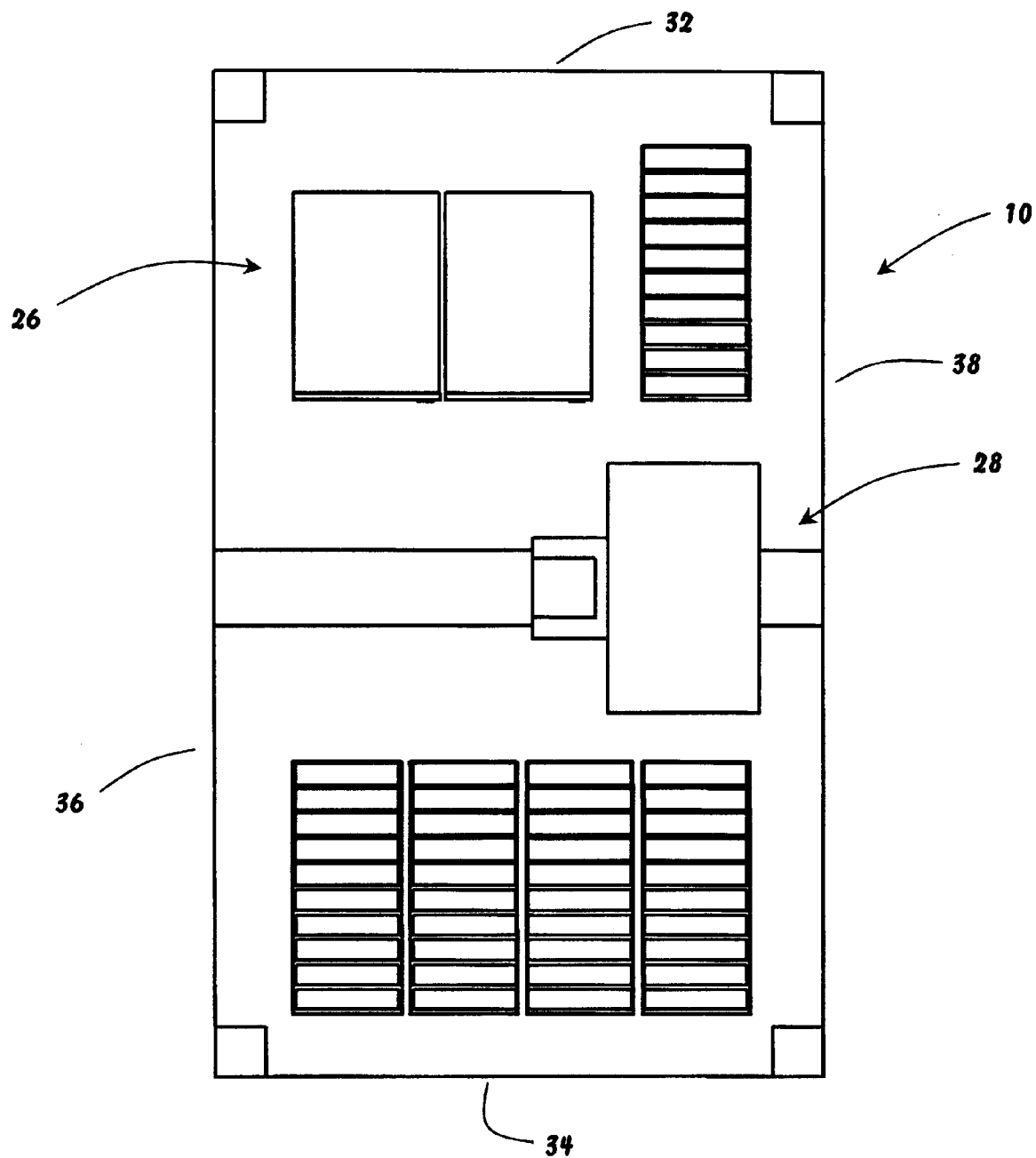
FIG. 2 is a top view of the data cartridge library system illustrated in FIG. 1.

With reference to FIGS. 1 and 2, an embodiment a data cartridge library system 20 that employs an architecture which yields a high data density footprint is illustrated. The data cartridge library system 20 is adapted for tape cartridges and, in particular, DLT and LTO tape cartridges. It should, however, be appreciated that the architecture is readily adapted to other types of tape cartridges (e.g., 4 mm, 8 mm and ½" tape cartridges) and other types of data cartridges, such as disk cartridges. Generally, the system 20 includes a cabinet 22 that houses a plurality of drawers 24 that are each capable of holding a plurality of tape cartridges, a plurality of tape drives 26 that are each capable of at least reading data previously established on the recording medium within a tape cartridge, and a transport device 28 for moving tape cartridges between the drawers 24 and the tape drives 26. Typically, the tape drives 26 are also capable of writing data on the recording medium within a tape cartridge. An interface (not shown) allows the system 20 to communicate with a host computer system or host computer systems on a network.

The cabinet 22 includes a first side 32, a second side 34, a third side 36 and a fourth side 38 that collectively define a rectangular, box-like structure. The third and fourth sides 36, 38 are each removable to allow the system 20 to be cascaded with one or more other library systems, if desired. The cabinet 22 further includes a bottom side 40 and a top side 42. The width of the cabinet 22, i.e., the distance between the third side 36 and the fourth side 38, is 24". The depth of the cabinet 22, i.e., the distance between the first side 32 and the second side 34 is 38". Consequently, the floor space occupied by the system is 912 sq-in. The height of the cabinet, i.e., the distance between the bottom side 40 and the top side 42 is 79". The dimensions of the cabinet are subject to modification if needed or desired for a particular application. For instance, for rack mounting, a cabinet with a width of approximately 17.5" is utilized. Further, the shape of the cabinet is subject to modification if needed or desired. For instance, a cabinet with a side surface that either: (a) forms a circle; (b) includes an arc; or (c) forms a circle or arc by the conjunction of two or more flat sides is feasible.

Figure 3:
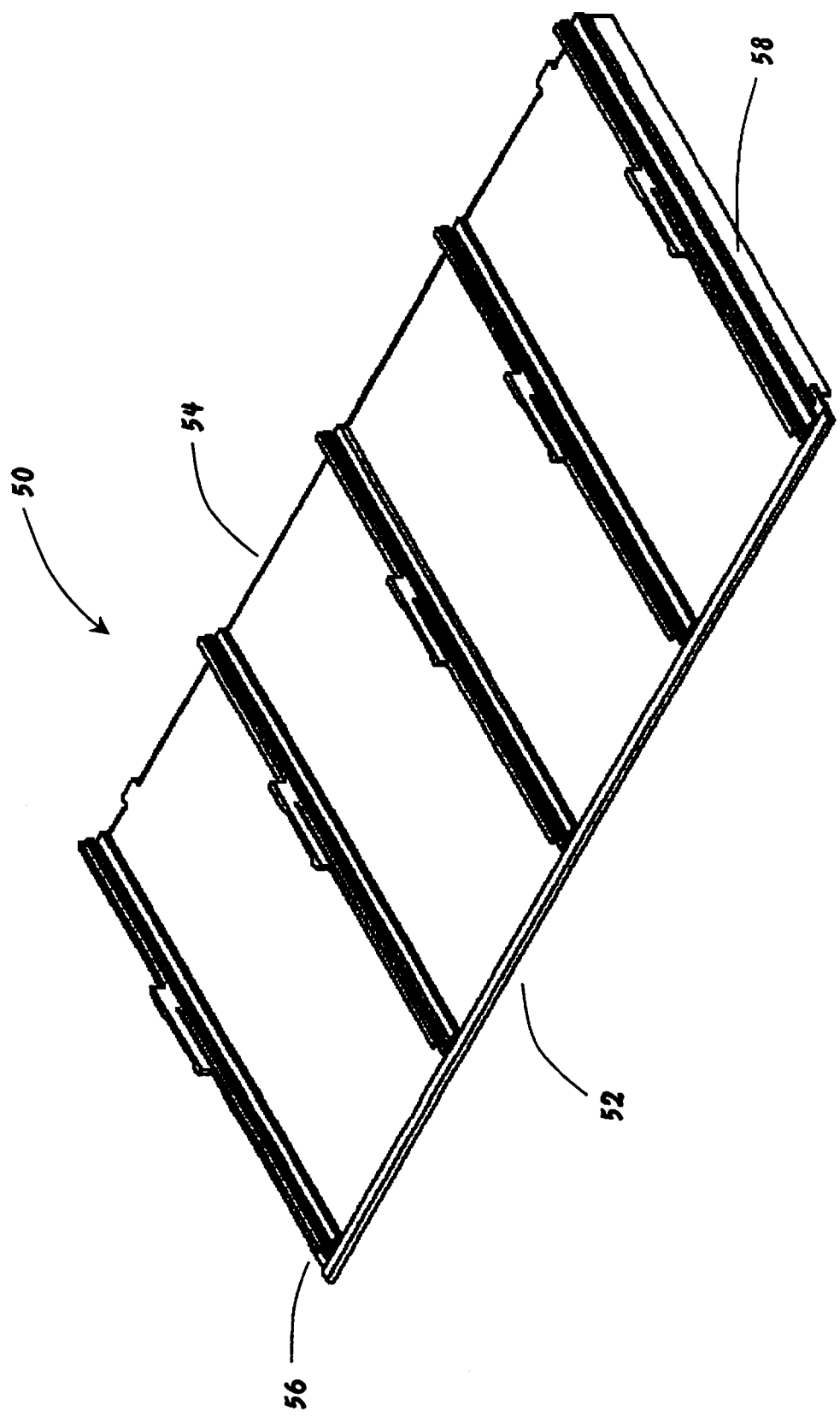
FIG. 3 illustrates a shelf for holding four drawers.

To hold the plurality of drawers 24, the system 20 includes a plurality of shelves. In the illustrated embodiment, the shelves that both extend from the first side 32 and are in area 46 and the shelves that extend from the second side 34 are each capable of holding four drawers. The shelves that both extend from the first side 32 and are in area 48 are each capable of holding one drawer. With reference to FIG. 3, a shelf 50 that is capable of holding four drawers is described. Generally, the shelf 50 includes a front edge 52, back edge 54, first side edge 56 and second side edge 58. The distance from the front edge 52 to the back edge 54 defines a depth for the shelf 50 that is sufficient to support a drawer. The distance from the first side edge 56 to the second side edge 58 is approximately the same as the width of the cabinet. The back edge 54 and the first and second side edges 56, 58 each engage one of the side walls of the cabinet 22 to fix the shelf in place within the cabinet 22.

It should be appreciated that although the shelf 50 holds four drawers with each drawer having a single row of slots, the shelf can be adapted to hold fewer drawers. For example, the shelf 50 can be adapted to hold two drawers with each drawer having two rows of slots or a single drawer with four rows of slots. The shelf 50 can also be adapted to hold more drawers if the drawers are adapted to hold cartridges of different dimensions than LTO and DLT tape cartridges. It should be appreciated that the dimensions of the shelf structure can be adapted to accommodate cabinets of different dimensions and to accommodate whatever layout of the drawers within a cabinet is desired. For instance, the shelf utilized in area 48 is of a similar structure to the shelf 50 but, as previously noted, only accommodates one drawer.

Figure 5:
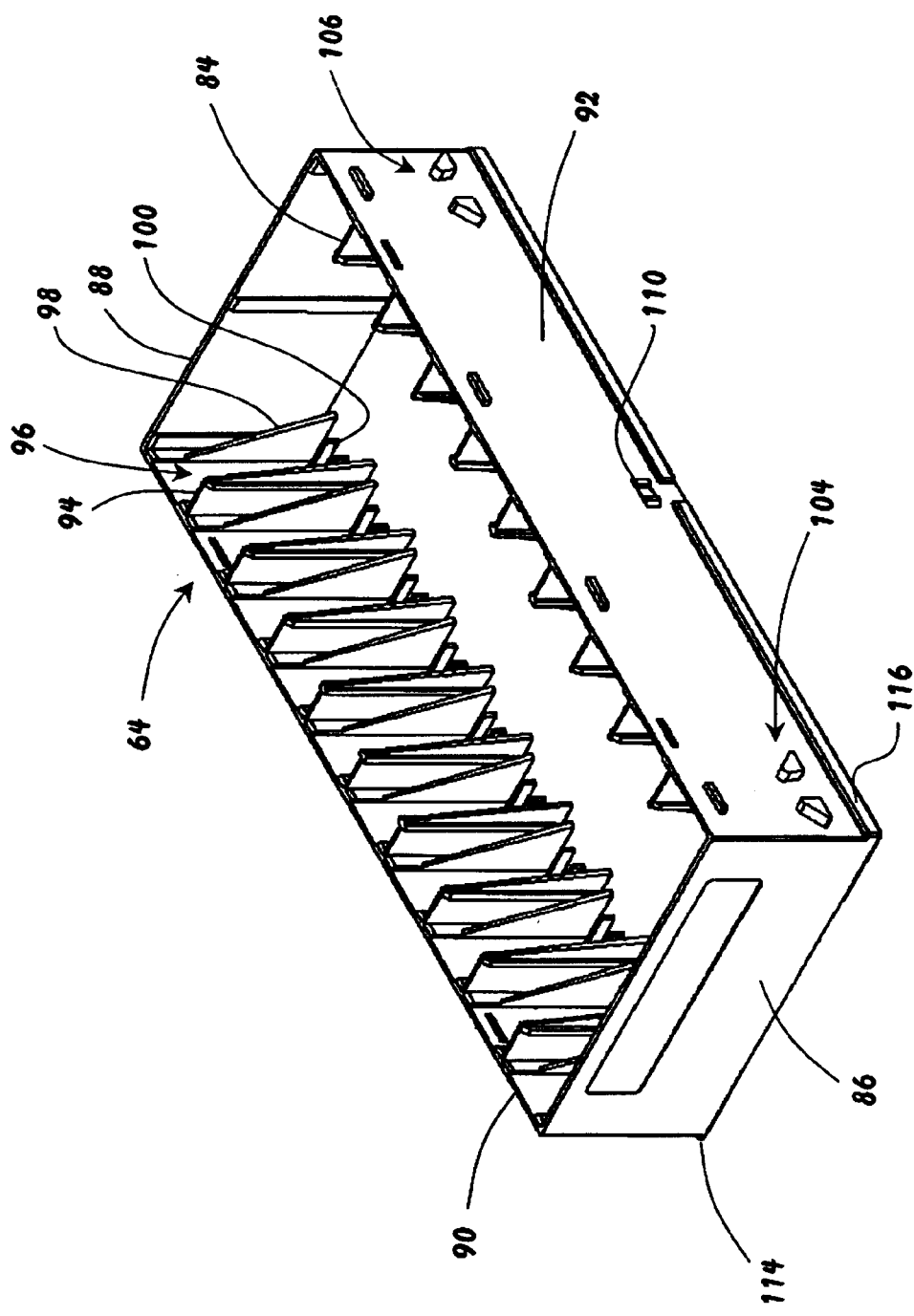
FIG. 5 illustrates a drawer for holding a plurality of LTO tape cartridges.

With reference to FIGS. 4A, 4B and 5, an LTO tape cartridge 62 and a drawer 64 that is capable of holding a plurality LTO tape cartridges are described. Generally, the LTO tape cartridge 62 includes a first cartridge face 66, a second cartridge face 68, a first cartridge side 70, a second cartridge side 72, a first cartridge end 74 and a second cartridge end 76. The distance between the first and second cartridge faces 66, 68 define the height of the cartridge, which is 0.86 in. The distance between the first and second cartridge side 70, 72 defines the width of the cartridge, which is 4.16 in. The distance between the first and second cartridge ends 74, 76 defines the depth of the cartridge, which is 4.03 in. The cartridge 62 further includes an orientation feature 78 that provides a basis for properly orienting the cartridge for insertion into a tape drive so that data can be read from and/or written to the recording medium within the cartridge 62. The orientation feature 76 also provides a basis for orienting all of the cartridges within a drawer in the same manner. The cartridge 62 also includes gripper notches 80A, 80B that are typically utilized by the transport device 28 to grip the cartridge 66 during transport between a drawer and a tape drive.

With reference to FIG. 5, the drawer 64 is an open-top, box-like structure that includes a drawer bottom 84, first drawer end 86, second drawer end 88, first drawer side 90 and second drawer side 92. Within the drawer 64, a plurality of dividers 94 divide the interior of the drawer into a plurality of slots 96, with each slot capable of accommodating an LTO tape cartridge. It should be appreciated that while the drawer 64 includes a single row of slots, a drawer with multiple rows of slots is also feasible. Associated with each slot is a cartridge orientation structure 98 that allows a properly oriented LTO tape cartridge to be inserted into the drawer 64 but prevents an improperly oriented LTO tape cartridge from being inserted into the drawer 64. To elaborate, if an LTO tape cartridge is properly oriented for insertion, the cartridge orientation structure 98 complements the space defined by the orientation feature 76 on the cartridge 62 and, as a consequence, the cartridge 62 can be inserted into the drawer 64. If an LTO tape cartridge is improperly oriented, the cartridge orientation structure 98 contacts a surface of the LTO tape cartridge such that the cartridge is prevented from being inserted into the drawer 64. Since the cartridge orientation structure 98 is the same for each of the slots 96, the orientation structures 98 operate to insure that every LTO data cartridge 62 that is placed in the drawer 64 has the same orientation. Also associated with each of the slots 96 is a stand-off structure 100 that positions LTO tape cartridges such that the gripper notches 80A, 80B are at the same height above the drawer bottom 84 as the gripper notch or notches associated with a DLT tape cartridge, thereby simplifying the design of the transport device 28. A drawer for DLT tape cartidges includes a plurality of slots, like the drawer 64, but the slots do not include stand-offs and a different orientation structure is utilized that takes advantage of an orientation notch in the DLT tape cartridges.

With continuing reference to FIG. 5, the drawer 64 further includes features that are used: (a) to pull a drawer off of a shelf so that a data cartridge can be inserted or removed from a slot and (b) to push a drawer onto a shelf. In the illustrated embodiment, a first pair of push/pull features 104 are located adjacent the first drawer end 86, with one of the pair located on the first drawer side 90 (not shown) and the second of the pair located on the second drawer side. The first pair of push/pull features 104 are utilized by the transport device 28 to push/pull the drawer 64 when the drawer 64 is oriented such that the first drawer end 86, when the drawer is on a shelf, is adjacent the transport device 28 and the second drawer end 88 is adjacent one of the side walls. A second pair of push/pull features 106 are located adjacent to the second drawer end 88, with one of the pair located on the first drawer side 90 (not shown) and the second of the pair located on the second drawer side. The second pair of push/pull features 106 are utilized by the transport device 28 to push/pull the drawer 64 when the drawer 64 is oriented such that the second drawer end 88, when the drawer is on a shelf, is adjacent the transport device 28 and the first drawer end 86 is adjacent one of the side walls. It should be appreciated that other types of features can be utilized in pulling a drawer from a shelf and pushing a drawer onto a shelf, including holes. Further, features of the drawer other than a specific push/pull feature can be utilized. For instance, whichever of the first and second drawer ends 86,88 that is located adjacent a wall can be "hooked" to pull the drawer from a shelf, and whichever of the first and second drawer ends 86,88 that is adjacent the transport device 28 can be pushed to push a drawer back on a shelf. Another possibility is to grip the first and second drawer sides 90, 92 to push and pull the drawer.

With continuing reference to FIG. 5, the drawer 64 also includes a feature that is used to hold the drawer 64 on the shelf. In the illustrated embodiment, a detent 110 is located on the first drawer side 90. The detent 110 cooperates with a cantilevered member associated with the shelf to form a passive latching mechanism, i.e. a latching mechanism where the pushing/pulling of the drawer 64 actuates the mechanism. It should be appreciated that the drawer can be adapted to incorporate different types of passive latching mechanisms. Additionally, the drawer can be adapted for use with an active latching mechanism, i.e., a mechanism where something more than the pushing/pulling of the drawer actuates the mechanism. For instance, a component of the transport mechanism may actuate a switch associated with an active latch to release the drawer or to fix the drawer in place. It is also possible to avoid the use of a latching mechanism by sloping the shelf such that a drawer disposed on the shelf tends to slide away from the transport mechanism 28. Such an approach is, however, likely to complicate the design of the transport assembly.

With continued reference to FIG. 5, the drawer 64 further includes a drawer orientation feature, i.e., a feature that is used to insure that the drawer has a particular orientation within the cabinet 22. More specifically, the drawer orientation feature is used to determine, when the drawer is on a shelf, which of the first and second drawer ends 86, 88 is adjacent the transport device 28 and which of the first and second drawer ends 86,88 is disposed adjacent to a side. The drawer orientation feature cooperates with another orientation feature associated with the shelf to orient the drawer as desired. In the illustrated embodiment, the drawer orientation feature includes a first rail 114 located on the first drawer side 90 and a second rail 116 located on the second drawer side 92. The orientation function is achieved by the first rail 114 not extending as far upward from the drawer bottom 84 as the second rail 116. Other types of orientation features are feasible.

Figure 6:
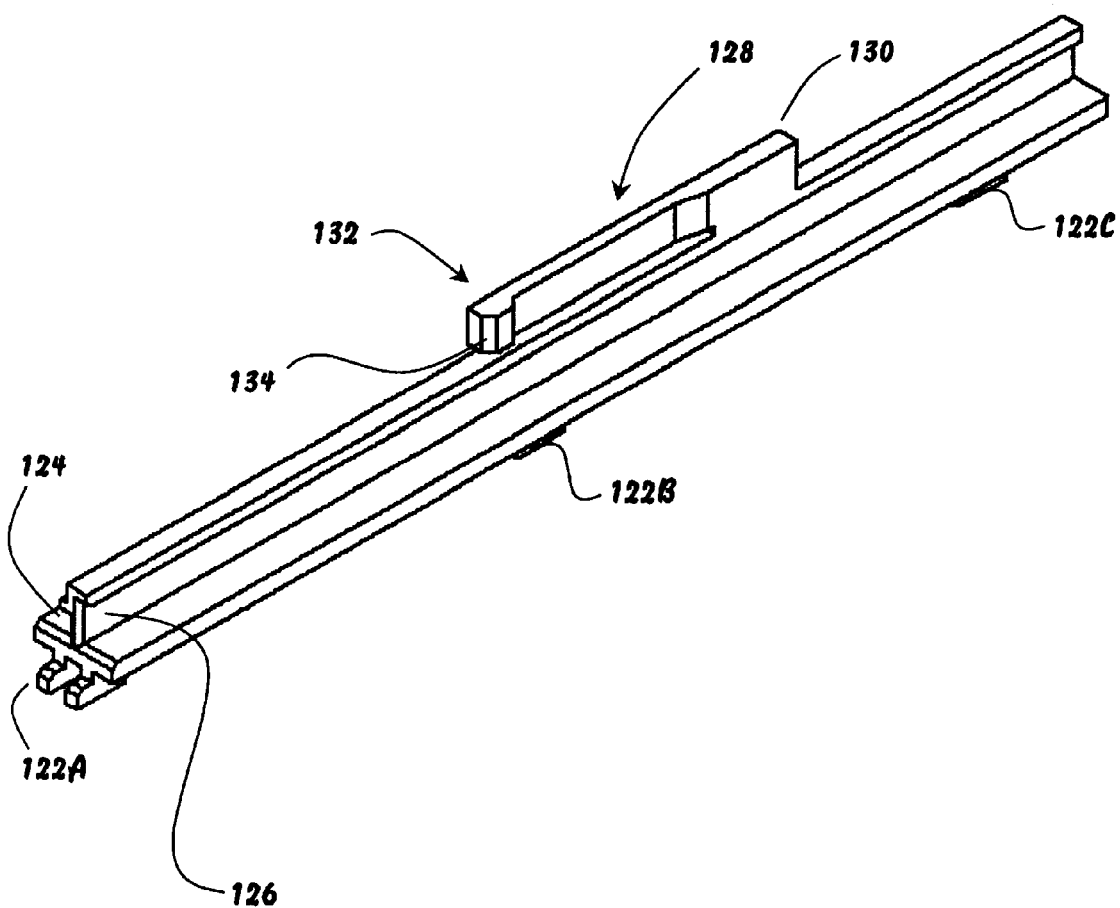
FIG. 6 illustrates a cleat that is associated with the shelf of FIG. 3 and includes features used to orient a drawer on a shelf and to latch a drawer on the shelf.

With reference to FIG. 6, a cleat 120 that is associated with a shelf includes both a cantilevered member for cooperating with the detent 110 to form a latch and an orientation structure for cooperating with the first and second rails 114, 116 is described. The cleat 120 includes a plurality of prongs 122A–122C that engage holes in a shelf, such as shelf 50, and operate to hold the cleat 120 in place on the shelf. The cleat 120 further includes a first cleat slot 124 that is capable of accommodating the first rail 114 of the drawer 64 but not the second rail 116 of the drawer 164. A second cleat slot 126 is sized to accommodate the second rail 116 of the drawer 64. The cleat 120 further includes a cantilever member 128 for cooperating with the detent 110 associated with the drawer 64 to form a latch to hold the drawer 64 on a shelf. The cantilever member 128 includes a fixed end 130 and a free end 132. Associated with the free end 132 is a head 134 that is shaped to engage the detent 110. In operation, the head 134 engages the detent 110 of the drawer 64 when the drawer 64 is fully inserted on a shelf, thereby latching the drawer 64 in place on the shelf. When the transport mechanism 28 is used to push the drawer onto a shelf or pull a drawer from a shelf, the free end 132 of the cantilever member 128 flexes. When the drawer 64 is being pulled from a shelf, this flexion causes the head 134 to disengage from the detent 110 and thereby allow the drawer 64 to be pulled from the shelf. When the drawer 64 is being pushed onto a shelf, the flexion allows the drawer 64 to be pushed onto the shelf until the drawer 64 is at a point at which, due to the spring action of the cantilever member 128, the head 134 engages the detent 110. As previously noted different latching mechanisms and orientation mechanism are feasible, including latching and orientation mechanisms in which the portions of each mechanism that are associated with the shelf are separate from one another as opposed to being integrated with one another, as in the cleat 120.

Figure 7:
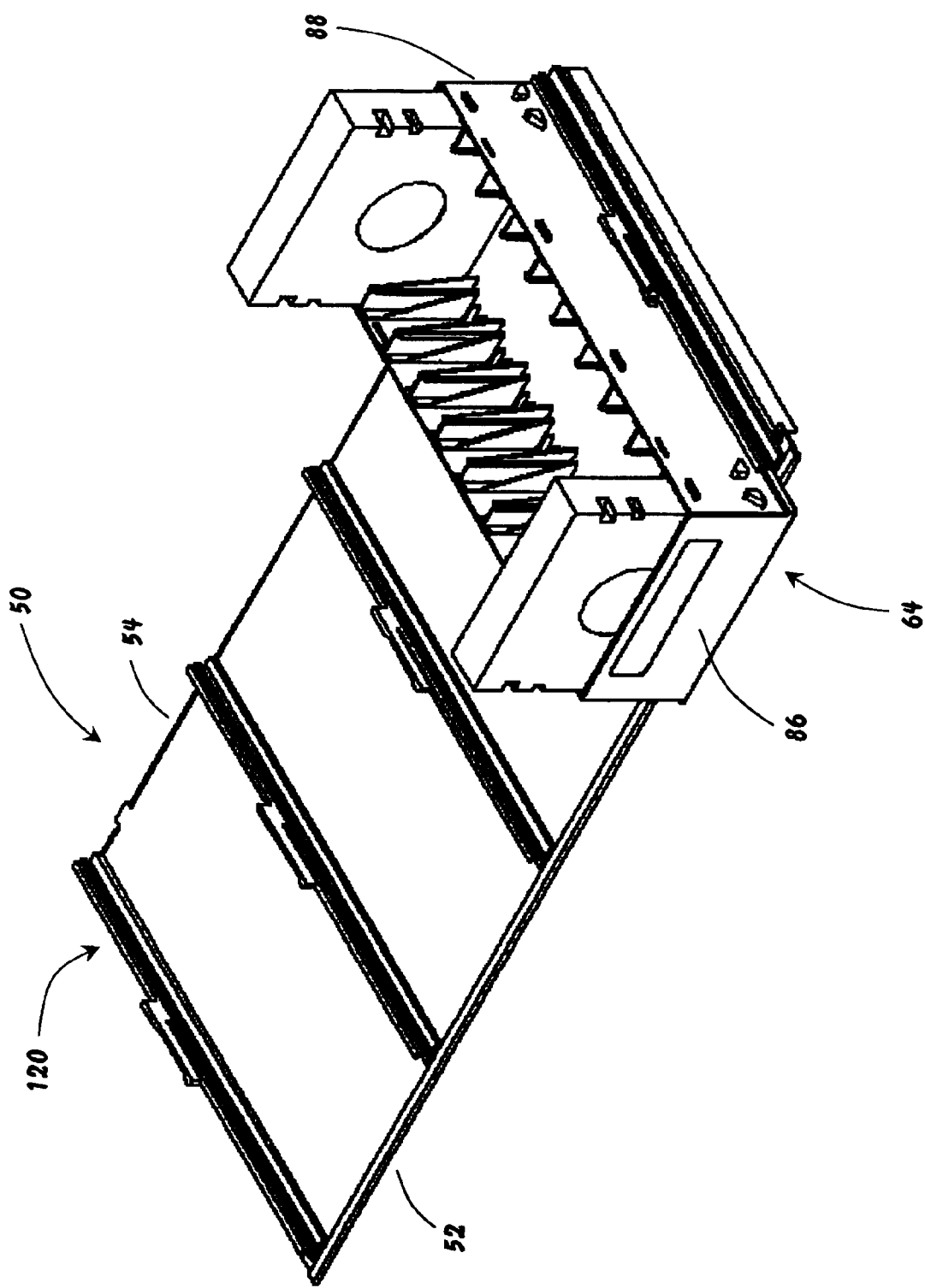
FIG. 7 illustrates the shelf of FIG. 3 supporting a single drawer.

With reference to FIGS. 3 and 7, the shelf 50 includes five cleats 120 that are each oriented on the shelf 50 in same way and, more specifically, so that the first drawer end 86 of any drawer 64 situated on the shelf will be adjacent the front edge 52 of the shelf 50 and the second drawer end 88 will be adjacent the back edge 54 of the shelf 50. As shown in FIG. 7, the orientation features 98 within the drawer operate to hold each of the LTO tape cartridges 62 located therein in the same orientation, i.e., with the first and second cartridge faces 64, 66 substantially parallel to the first and second drawer ends 86, 88. If, for example, the shelf 50 was one of the shelves extending away from the second side 34 of the cabinet 22, the first and second rails 114, 116 associated with any drawers on the shelf and the first and second cleat slots 124, 126 associated with each of the cleats would orient the drawers such that the first drawer end 86 was positioned adjacent the transport device 28 and the second drawer end 88 was positioned adjacent the second side 34 of the cabinet. Further, the cartridge orientation structures 98 within each drawer would operate such that each of the LTO tape cartridges is oriented so that the gripper notches 80A, 80B are exposed, the second faces 68 of each of the cartridges faces the transport device 28, and the first face 66 of each of the cartridges faces the second side 34. Consequently, the first and second faces 66, 68 (i.e., the faces of the cartridge with the greatest surface areas relative to the other faces of the cartridge) of each of the cartridges are also positioned substantially parallel to the first and second sides 32, 34 of the cabinet 22. It should be appreciated that the drawer 64 and whatever structures are associated with the shelves that serve to orient a drawer on a shelf can be modified such that what are now the sides of the drawer 64 become the drawer ends and any cartridges that are positioned in the drawers are oriented such that the faces of the cartridges with the greatest surface area are oriented substantially parallel to the third and fourth sides 36, 38 of the cabinet 22.

To facilitate the transfer of a drawer from a first shelf extending away from the second side 34 to a second shelf extending away from the first side 32, the cleats on the second shelf are the mirror image of the cleats on the first shelf. Consequently, the first and second cleat slots 124, 126 on the second shelf require that, when the drawer is on the shelf, the drawer 64 be oriented such that the second drawer end 88, rather than the first drawer end 86, is located adjacent the transport device 28 and the first drawer end by located adjacent the first side 32. By forcing the drawers on the shelves extending from the first side 32 to be oriented such that the second drawer end 88 is adjacent the transport device 28 and the drawers on the shelves extending from the second side 34 to be oriented such that the first drawer end 86 is adjacent the transport device 28, the transport device 28 can move a drawer from shelves on one side to a shelf on the opposite side without having to rotate the drawer. Stated differently, a drawer can be moved from a shelf on one side to a shelf on the opposite side by translating the drawer.

With reference to FIG. 2, the transport device 28 occupies and is capable of moving in the space between the ends of any drawers that are located on the shelves associated with the first side 32 and the ends of any drawers that are located on the shelves associated with the second side 34. Further, the transport device 28 operates to pull drawer from shelves and to push drawers onto shelves. It should be appreciated that is necessary to pull a drawer from a shelf because the structure surrounding each drawer prevents the transport mechanism from accessing all of the slots associated with a drawer when the drawer is on a shelf. Additionally, the transport device 28 operates to pick a cartridge from a slot in a drawer after the drawer has been sufficiently withdrawn from a shelf; convey a cartridge that has been picked from a drawer to one the tape drives 26; retrieve a cartridge from one of the tape drives 26; and replace a retrieved cartridge in a slot of a drawer. The transport device 28 is also capable of moving a drawer from a shelf on one side of the cabinet 22 to a shelf on the same side of the cabinet 22 or to a shelf on the opposite side of the cabinet 22.

The embodiment described hereinabove is intended to explain the best mode known of practicing the invention and to enable others skilled in the art to utilize the invention.

What is claimed is:

1. A data cartridge library system that is capable of accommodating at least two, moveable cartridge drawers with each drawer comprising a closed-loop structure that defines a drawer interior space, a plurality of parallel slots defined within the drawer interior space with each slot capable of accommodating a data cartridge, and an opening through which data cartridges are inserted/removed into/from the drawer interior space, the system comprising:

a cabinet having a first side, a second side that is substantially parallel to said first side, a third side, and a fourth side that is substantially parallel to said third side, wherein said first side is substantially perpendicular to said third side, wherein said first, second, third and fourth sides define an interior space;

one or more drives, located within said cabinet and occupying a first interior sub-space of said interior space, with each drive capable of reading data located on a recording medium located in a data cartridge and/or writing data onto a recording medium located in a data cartridge;

a shelf system, located within said cabinet and occupying a second interior sub-space of said interior space, for supporting at least two cartridge drawers;

wherein said shelf system comprises one or more shelves;

wherein each shelf of said shelf system is substantially horizontally disposed;

wherein each shelf is vertically spaced from any overlying surface by a distance that is greater than a vertical dimension of a data cartridge when the data cartridge is positioned such that the face of the data cartridge with the greatest surface area is located in a vertical plane;

wherein each shelf of said shelf system comprises a guide structure for orienting each cartridge drawer that said shelf is capable of accommodating;

a third interior sub-space of said interior space for accommodating the movement of a transport mechanism that is capable of moving a data cartridge between said one or more drives and a slot of a drawer located on a shelf of said shelf system;

wherein when a drawer is oriented on a shelf of said shelf system by said guide structure and the drawer is holding a data cartridge in any one of the parallel slots, the face of the data cartridge with the greatest surface area is substantially parallel to one of said first side and said third side of said cabinet.

2. A data cartridge library, as claimed in claim 1, wherein:
a shelf of said shelf system having a depth that is less than the length of a drawer.

3. A data cartridge library, as claimed in claim 1, wherein:
a shelf of said shelf system having at least a portion of a device for retaining a drawer.

4. A data cartridge library, as claimed in claim 1, wherein:
a shelf of said shelf system is oriented to slope downward from a first point on said shelf that is adjacent to said third interior sub-space of said interior space to a second point on said shelf that is adjacent to one of said first, second, third and fourth sides of said cabinet.

5. A data cartridge library system, as claimed in claim 1, wherein:
said guide structure serving to orient a drawer such that one end of the drawer is adjacent to said first side.

6. A data cartridge library system, as claimed in claim 1, wherein:
a shelf of said shelf system is capable of holding only one drawer.

7. A data cartridge library system, as claimed in claim 1, wherein:
a shelf of said shelf system is capable of holding more than one drawer.

8. A data cartridge library system, as claimed in claim 1, wherein:
said shelf system comprises only one shelf.

9. A data cartridge library system, as claimed in claim 1, wherein:
said shelf system comprises a first shelf and a second shelf that is located above said first shelf.

10. A data cartridge library system, as claimed in claim 1, wherein:
said shelf system comprises a first shelf that extends away from said first side and a second shelf that extends away from said second side.

11. A data cartridge library system, as claimed in claim 10, wherein:
said first shelf is at substantially the same height as said second shelf.

12. A data cartridge library system, as claimed in claim 10, wherein:
said first shelf having a first guide structure for insuring that if a drawer is placed on said first shelf, a first end of a drawer is adjacent to said first side, and said second shelf having a second guide structure for insuring that if said drawer is placed on said second shelf, a second end of said drawer is adjacent said second side.

13. A data cartridge library system, as claimed in claim 10, wherein:
a portion of said third interior sub-space of said interior space extends between said first shelf and said second shelf except for when a transport device is positioned therein.

14. A data cartridge library system, as claimed in claim 1, wherein:
a drive of said one or more drives is positioned so that a plane that contains an opening in said drive for receiving a data cartridge is substantially parallel to said first side.

15. A data cartridge library system, as claimed in claim 1, wherein:
a drive of said one or more drives is positioned so that a shelf is located above or below said drive.

16. A data cartridge library system, as claimed in claim 1, wherein:
a drive of said one or more drives is positioned so that a shelf is located to the side of said drive.

17. A data cartridge library system, as claimed in claim 1, wherein:
a drive of said one or more drives is positioned so that a plane that contains an opening for receiving a cartridge is substantially parallel to said third side.

18. A data cartridge library system comprising:
a cabinet having a first side, a second side that is substantially parallel to said first side, a third side, and a fourth side that is substantially parallel to said third side, wherein said first side is substantially perpendicular to said third side, wherein said first, second, third and fourth sides define an interior space;

one or more drives, located within said cabinet and occupying a first sub-space of said interior space, with each drive capable of reading data located on a recording medium contained in a data cartridge and/or writing data onto a recording medium contained in a data cartridge;

a shelf system, located within said cabinet and occupying a second interior sub-space of said interior space, for supporting at least two cartridge drawers;

wherein said shelf system comprises one or more shelves;

wherein each shelf of said shelf system comprises a first guide structure for orienting each cartridge drawer that said shelf is capable of accommodating;

a third interior sub-space of said interior space for accommodating the movement of a picker that serves in moving a data cartridge between said one or more drives and a slot of a drawer located on a shelf of said shelf system;

at least two cartridge drawers with each drawer comprising a closed-loop structure that defines a drawer interior space, a plurality of parallel slots defined within said drawer interior space that are each capable of holding a data cartridge, an opening through which data cartridges are inserted/removed into/from the drawer interior space, and a second guide structure for cooperating with said first guide structure associated with a shelf of said shelf system to orient the cartridge drawer on a shelf of said shelf system;

wherein when said first guide structure associated with a shelf of said shelf system cooperates with a second guide structure associated with any one cartridge drawer of said at least two cartridge drawers to orient said cartridge drawer with respect to said shelf and if said drawer is holding a data cartridge in any one of said parallel slots, said first and second guide structures cooperate to orient said any one cartridge drawer such that the face of the data cartridge with the greatest surface area is substantially parallel to one of said first side and said third side of said cabinet and the opening of the cartridge drawer faces a direction other than towards said third interior sub-space of said interior space.

19. A data cartridge library system, as claimed in claim 18, wherein:

each of said drawers comprises a plurality of aligned slots.

20. A data cartridge library system, as claimed in claim 18, wherein:

said second guide structure serving to orient said drawer such that one end of said drawer is located adjacent said first side.

21. A data cartridge library system, as claimed in claim 18, wherein:

each of said drawers comprises an orientation structure associated with each slot for insuring that each cartridge located within said drawer has a desired orientation.

22. A data cartridge library system, as claimed in claim 18, wherein:

each of said drawers comprises at least a portion of a latch.

23. A data cartridge library system, as claimed in claim 18, wherein:

each of said drawers comprises a stand-off associated with each slot so that the end of a cartridge that is furthest from the bottom of drawer is at the same height relative to the bottom for two different types of cartridges.

24. A data cartridge library system, as claimed in claim 18, wherein:

at least one of said at least two cartridge drawers includes two rows of parallel slots.

25. A data cartridge library system, as claimed in claim 18, wherein:

said direction is upward.

26. A data cartridge library system, as claimed in claim 18, wherein:

when said first and second guide structures are cooperating to orient any one cartridge drawer of said at least two cartridge drawers, a first portion of said closed-loop structure is located between said third interior sub-space and a second portion of said closed-loop structure.

* * * * *

UNITED STATES PATENT AND TRADEMARK OFFICE
CERTIFICATE OF CORRECTION

PATENT NO. : 6,639,751 B2
DATED : October 28, 2003
INVENTOR(S) : Brace et al.

It is certified that error appears in the above-identified patent and that said Letters Patent is hereby corrected as shown below:

<u>Column 11,</u>
Line 28, delete "an orientation", and insert -- a cartridge orientation --.

Signed and Sealed this

Thirteenth Day of April, 2004

JON W. DUDAS
*Acting Director of the United States Patent and Trademark Office*